US012613756B2

(12) United States Patent
Kfir et al.

(10) Patent No.: US 12,613,756 B2
(45) Date of Patent: Apr. 28, 2026

(54) AI-DRIVEN PLATFORM FOR API DIALOGUE

(71) Applicant: CHECK POINT SOFTWARE TECHNOLOGIES LTD., Tel Aviv (IL)

(72) Inventors: Barak Kfir, Givat Shmuel (IL); Albert Havinson, Ramat Gan (IL); Nofar Bardugo, Ramat Gan (IL); Dan Karpati, Even Yehuda (IL); Tamir Zegman, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 467 days.

(21) Appl. No.: 18/476,480

(22) Filed: Sep. 28, 2023

(65) Prior Publication Data

US 2025/0110816 A1     Apr. 3, 2025

(51) Int. Cl.
*G06F 9/54* (2006.01)

(52) U.S. Cl.
CPC .................................... *G06F 9/547* (2013.01)

(58) Field of Classification Search
CPC ................................. G06F 9/547; G06F 9/541
See application file for complete search history.

(56) References Cited

U.S. PATENT DOCUMENTS

| 12,245,117 B1 * | 3/2025 | Scriber | ................... | H04L 45/42 |
| 12,375,568 B1 * | 7/2025 | Khermosh | .......... | H04L 61/2592 |
| 2023/0245651 A1 * | 8/2023 | Wang | ..................... | G06N 5/022 |
| | | | | 704/275 |

* cited by examiner

*Primary Examiner* — Craig C Dorais
(74) *Attorney, Agent, or Firm* — Renner, Otto, Boisselle & Sklar, LLP

(57) ABSTRACT

A system and method are provided for utilizing a service's Application Programming Interface (API) documentation, generating an OpenAPI specification for the API, enriching the OpenAPI specification with artificial intelligence (AI) generated explanatory notes, and integrating the enriched OpenAPI specification with an AI engine (e.g., a natural language model, large language model, etc.). This process may permit users to interact with the service through natural language.

20 Claims, 4 Drawing Sheets

<u>22</u>

70

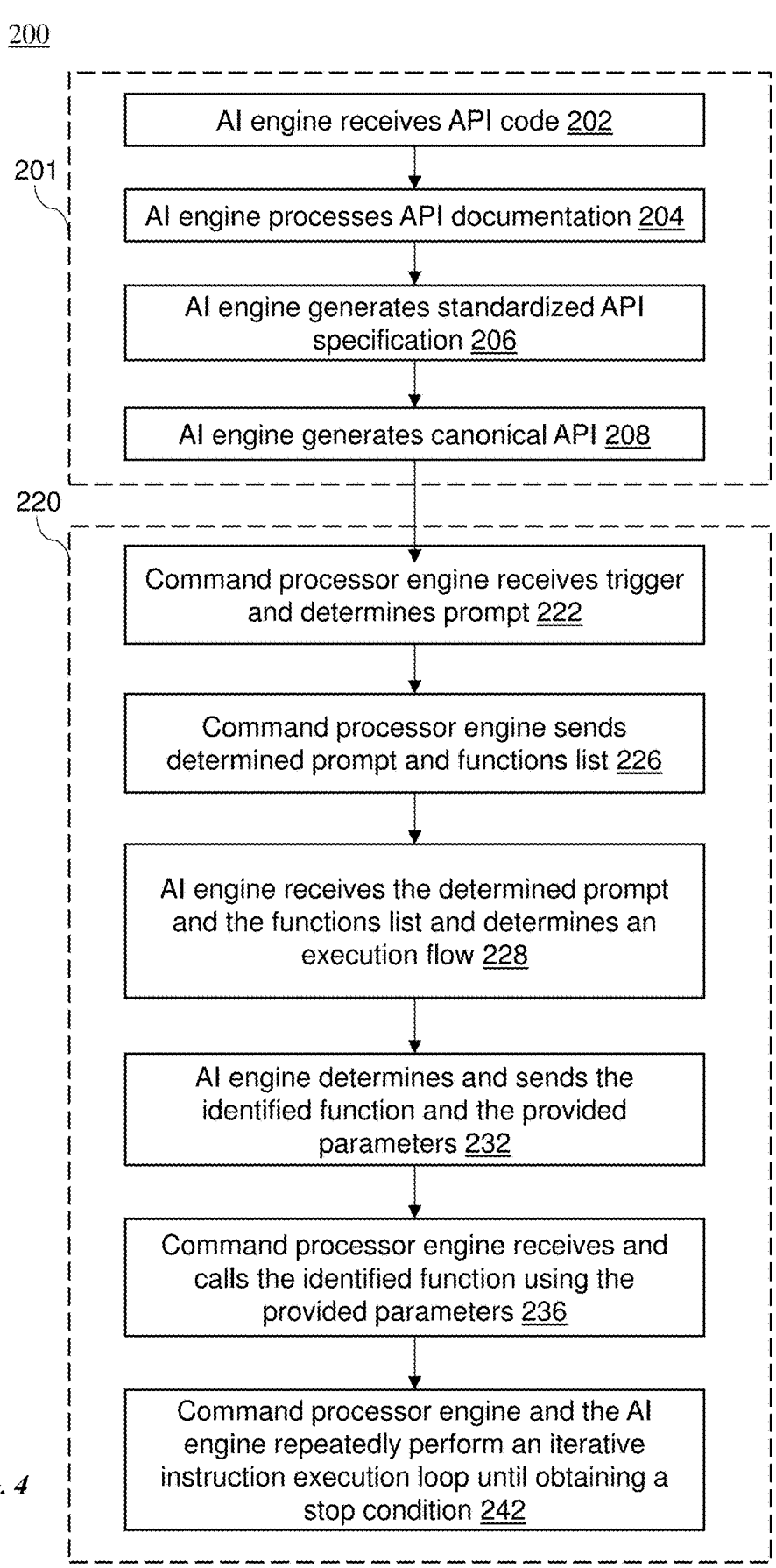

200

201

AI engine receives API code 202

AI engine processes API documentation 204

AI engine generates standardized API specification 206

AI engine generates canonical API 208

220

Command processor engine receives trigger and determines prompt 222

Command processor engine sends determined prompt and functions list 226

AI engine receives the determined prompt and the functions list and determines an execution flow 228

AI engine determines and sends the identified function and the provided parameters 232

Command processor engine receives and calls the identified function using the provided parameters 236

Command processor engine and the AI engine repeatedly perform an iterative instruction execution loop until obtaining a stop condition 242

*FIG. 4*

AI-DRIVEN PLATFORM FOR API DIALOGUE

TECHNICAL FIELD

The present disclosure relates generally to software services and application programming interfaces (APIs). More specifically, the disclosure relates to a system for enhancing and simplifying user interaction with software services and API using artificial intelligence.

BACKGROUND

In the realm of modern software engineering, Application Programming Interfaces (APIs) serve as a bridge to facilitate communication between different software applications. They allow diverse systems to interconnect and share data and functionalities. To ensure proper utilization of these APIs, detailed documentation is often needed. However, sufficiently detailed documentation is not always available for developers to comprehend and fully utilize these APIs.

Many developers find it challenging to navigate and extract pertinent information from extensive API documentation. Misunderstandings and misinterpretations of these documents can lead to integration issues, software inefficiencies, and in some cases, potential security vulnerabilities.

The digital landscape has seen a significant escalation in cybersecurity threats, targeting both emerging and established software services. As these threats continue to evolve, there is a pressing need for intelligent and automated solutions capable of managing the multifaceted nature of software services and their underlying APIs. Traditional API management solutions have often been criticized for their absence of real-time security measures and automated response systems. Furthermore, the common administration tasks associated with these APIs can become repetitive and time-consuming.

SUMMARY

A system is needed for not only simplifying the understanding of complex API documentation but that also incorporates real-time security mechanisms and eases routine administrative tasks.

The disclosure provides a system for transforming user interaction with application programming interfaces (APIs). By leveraging artificial intelligence (AI), the system translates API code and/or API documentation into user-friendly natural language. The system also includes a command processor engine (also referred to as a driving engine) for performing function calls. The command processor engine may act upon a myriad of triggers, ensuring real-time responses to potential threats, user needs, etc. User interaction with the system may also be simplified using shortcuts and a library of actions for simplifying routine tasks and enhancing operational efficiency.

The present disclosure provides a system and method for utilizing a service's Application Programming Interface (API) documentation, generating an OpenAPI specification for the API, enriching the specification with artificial intelligence (AI) generated explanatory notes, and integrating the enriched specification with an AI engine (e.g., a natural language model, large language model, etc.). This process may permit users to interact with the service through natural language.

The system may pertain to a secure, automated system that incorporates a driving engine to manage and control APIs. This system may integrate the driving engine with an AI engine to facilitate natural language-based API interaction. The system may also enhance interactions with the service through customizable shortcuts and a library of shortcuts.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 4 is an exemplary flow diagram of a method for enabling natural language interaction with an application programming interface (API) for performing a service.

Figure 1:
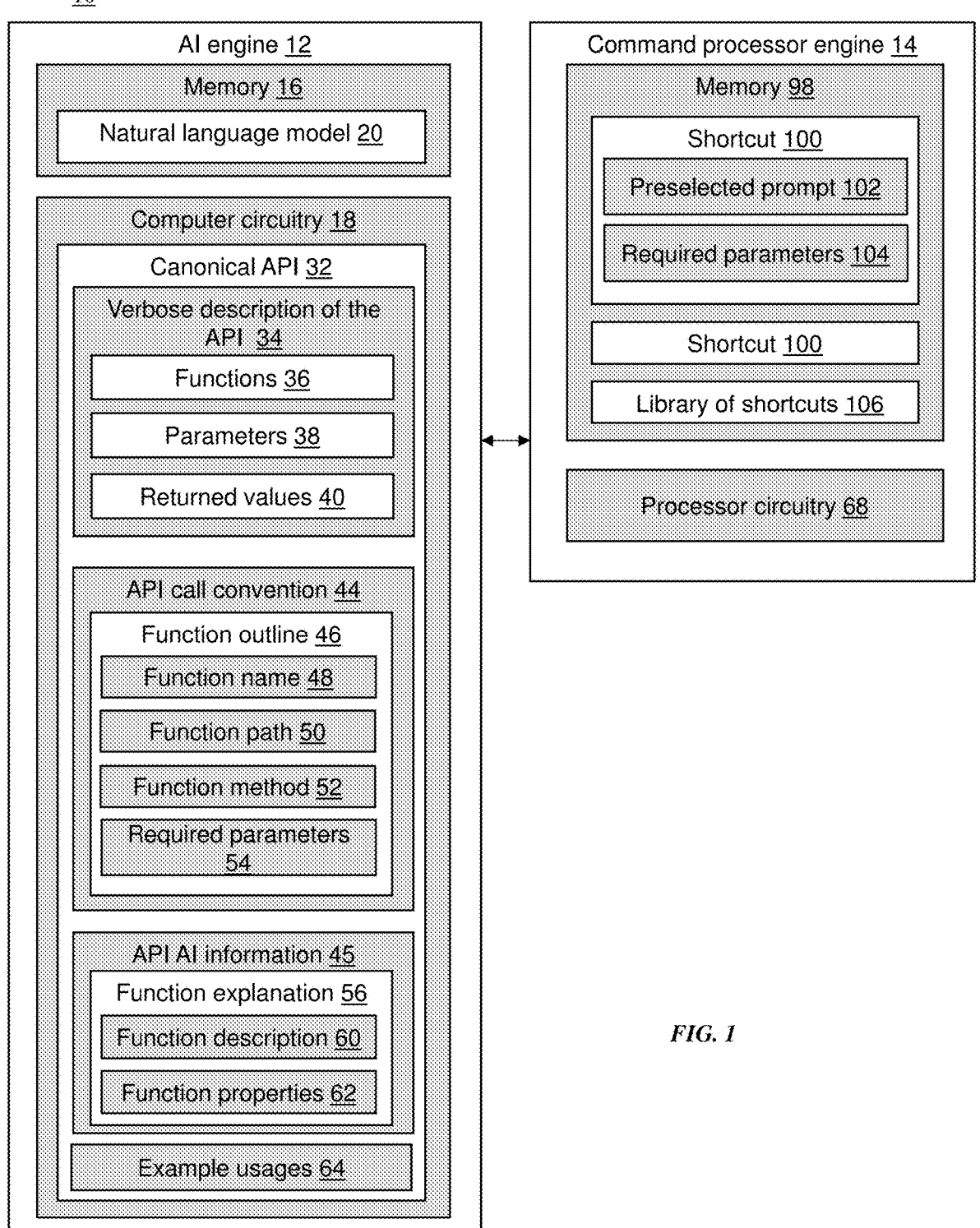
FIG. 1 is an exemplary diagram of a system for enabling natural language interaction with an application programming interface (API) for performing a service.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a system and device for enabling natural language interaction with an application programming interface (API) for performing a service. The system uses a creation flow for learning about the API and a usage flow for accomplishing an intended result with the API.

Turning to FIG. 1, a system 10 is shown for enabling interaction with one or more application programming interface (API) through natural language. The system 10 utilizes the combined capabilities of an artificial intelligence (AI) engine 12 and a command processor engine 14.

The AI engine 12 is a computer device that includes a memory 16 and computer circuitry 18. The memory 16 (also referred to as a non-transitory computer readable medium)

stores a natural language model (NLM) 20. The NLM 20 allows the system 10 to receive and process natural language commands and prompts.

The NLM 20 may be based on any suitable language model adept at processing and interpreting natural language requests. For example, the NLM 20 may be trained on extensive datasets comprising diverse linguistic patterns and structures to equip the NLM 20 to recognize, understand, and respond to a wide array of natural language inputs with precision.

Figure 2:
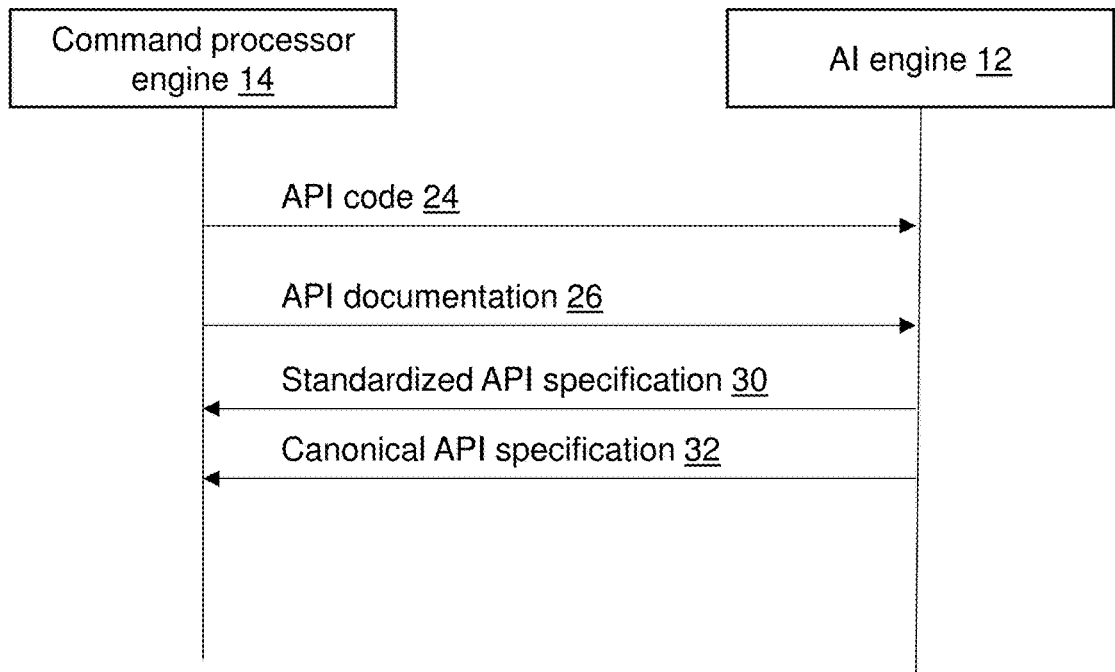
FIG. 2 is a ladder diagram showing movement of information in a creation flow between an artificial intelligence (AI) engine and command processor engine of the system.

With exemplary reference to FIG. 2, the AI engine 12 is configured to perform a creation flow 22. In the creation flow 22, the AI engine 12 receives API code 24. This API code 24 is computer code executed by a computer (e.g., a server) to perform a service. The computer code may be source code comprising human-readable instructions and statements written in a programming language (such as Java, JavaScript, Python, C++, HTML, Ruby, PHP, Swift, etc.) that is compiled or interpreted to produce executable software. In one embodiment, the computer code may include binary machine code.

Upon receiving the API code 24, the AI engine 12 processes API documentation 26. Processing the API documentation 26 comprises receiving existing API documentation 26 or using the supplied API code 24 to generate the API documentation 26. For example, the processing of the API documentation 26 may be performed by sending the API documentation 26 to the AI engine 12 or sending a request to the AI engine 12 to generate the API documentation 26 from the API code 24.

The creation flow 22 further includes generating a standardized API specification 30 from the API documentation 26. That is, in the creation flow 22 the AI engine 12 processes the API documentation 26 to generate the standardized API specification 30. This transformation to the standardized API specification 30 may align the API with specific standards and protocols. For example, the standardized API specification 30 may adopt a widely recognized format, such as the format described by the OpenAPI Specification, which was previously part of the Swagger framework. By mapping the API documentation 26 into the standardized API specification 30 having such a format, a consistent and clear blueprint may be provided for developers and stakeholders. For example, using the standard OpenAPI specification format may ensure uniformity in representation, allowing for accurate integration across multiple platforms and minimizing potential discrepancies in diverse software ecosystems.

The creation flow 22 also includes the AI engine 12 generating a canonical API specification 32 from the standardized API specification 26, representing a more detailed representation of the API. The canonical API specification 32 includes a verbose description of the API 34 including functions of the API 36, parameters received by the API 38, and values returned by the API 40. The canonical API specification 32 may be structured in accordance with established standards, such as the YAML or JSON formats.

In one embodiment, the canonical API specification 32 may include an API call convention 44 and API AI information 45. The API call convention 44 may include at least one function outline 46. Each function outline 46 may include a function name 48, a function path 50, a function method 52, and required parameters 54. The API AI information 45 may include at least one function explanation 56. Each function explanation 56 may include the function name 48, a function description 60, function properties 62, and required parameters 54.

In one embodiment, the canonical API specification 32 includes example usages of the API 64. The example usages 64 may serve as practical demonstrations, showcasing the relationship between received parameters 38 and the resultant values returned by the API 40. Each example usage 64 may include one or more of the received parameters 38 and one or more of the returned values of the API 40. The example usages 64 may be generated by the AI engine 12 from the API documentation 26. That is, the AI engine 12 may use the API documentation 26 to extract, refine, and present relevant examples as part of the canonical API specification 32.

Figure 3:
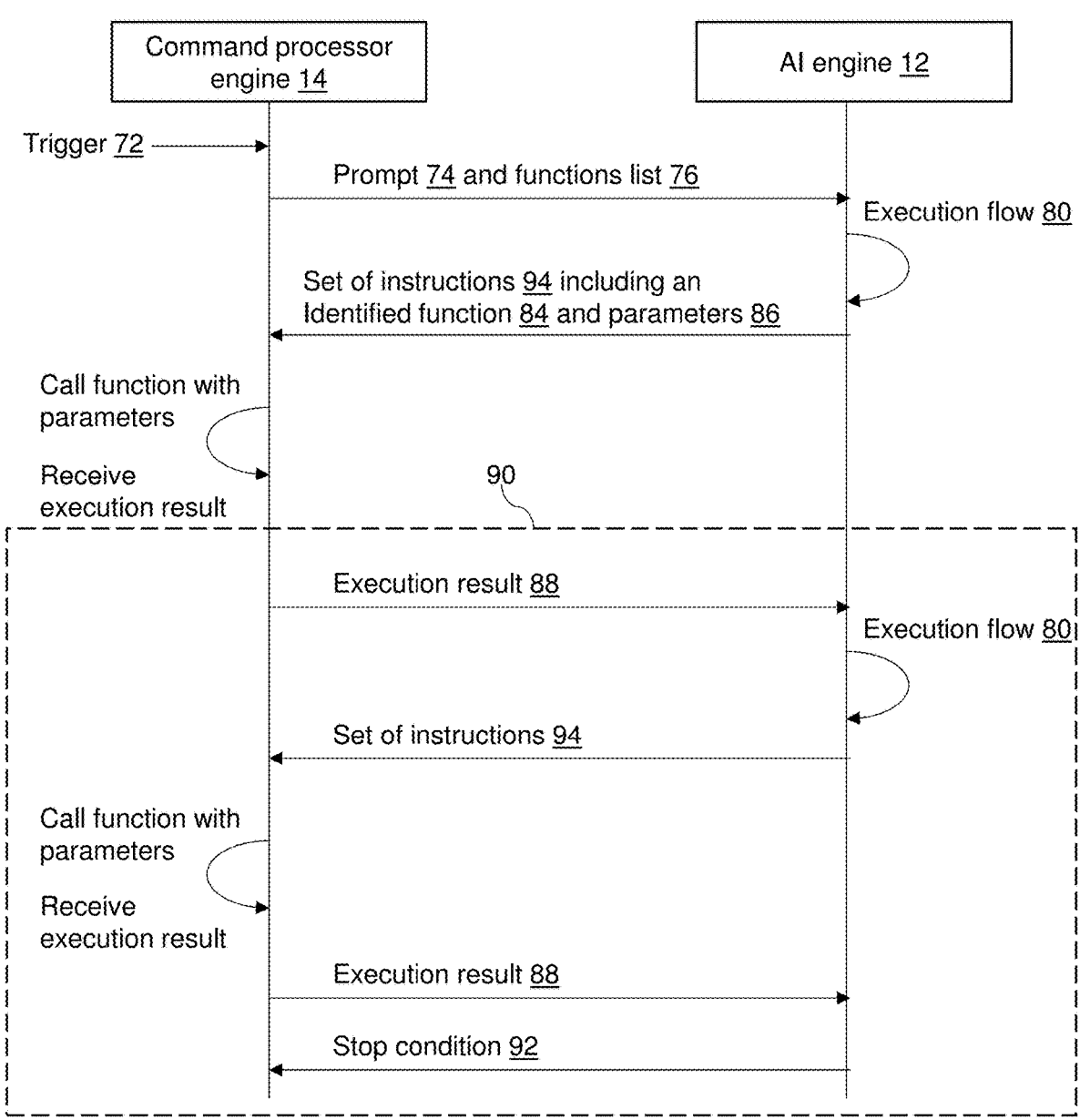
FIG. 3 is a ladder diagram showing movement of information in a usage flow between the AI engine and the command processor engine of the system.

The command processor engine 14 of the system 10 is an electronic device (e.g., a computer) including processor circuitry 68. With exemplary reference to FIG. 3, the command processor engine 14 performs a usage flow 70 in conjunction with the AI engine 12. In the usage flow 70, the command processor engine 14 receives a trigger 72. The trigger 72 may initiate the usage flow 70. For example, the trigger 72 may include a range of events, such as one or more of a user input (e.g., text input describing a desired goal to achieve), an event trigger initiated by a detected event, a time trigger initiated at a specific time or periodically, etc. For example, when a security event occurs (e.g., a change to a security policy, or an attack being detected) a trigger may be sent to the command processor engine 14. The system 10 may be used to manage security products. For example, the system 10 may receive triggers 72 related to security matters (e.g., periodic security checks, changes to security polices, etc.) and the system 10 may be used to interface with security products via an API. That is, the system 10 may be used to accomplish tasks by using API(s) for security product(s). For example, the API may be a management API for accessing multiple APIs (such as the Check Point Management API, ServiceNow, etc.).

The command processor engine 14 determines a prompt 74 from the received trigger 72. The prompt 74 may be a request to the AI engine 12 based on the received trigger 72. For example, the trigger 72 may be a monthly task to be performed. The prompt 74 may be a natural language description of the task to be performed. The command processor engine sends to the AI engine 12 the determined prompt 74 and a functions list 76 of the functions of the API. For example, the functions list 76 may be generated from the function outlines 46 stored in the API call convention 44. The functions list 76 may be used to determine an order of operation to accomplish the prompt 74 as described below.

Upon receiving the prompt 74 and the functions list 76, the AI engine 12 determines an execution flow 80 of one or more function calls for obtaining an intended result based on the received prompt 74 and the functions list 76. That is, the prompt 74 may specify a natural language goal (e.g., create a new firewall rule) and the AI engine 12 may generate from this prompt an intended result (e.g., an output from the API indicating a status of a new firewall rule). The execution flow 80 comprises the function call(s) for obtaining this intended result. For example, successfully creating the intended result may require multiple different sequential function calls with input parameters to these function calls that depend on the previously called functions.

The AI engine 12 identifies from the execution flow 80 a function 84 and the provided parameters 86 for calling the identified function 84. For example, the function 84 may be the first function in the execution flow 80. The AI engine 12 sends the identified function 84 and the provided parameters 86 to the command processor engine 14.

Upon receiving the identified function 84 and the provided parameters 86 for calling the identified function 84, the command processor engine 14 calls the identified function 84 of the API using the provided parameters 86. The command processor engine 14 receives an execution result 88 of calling the identified function 84 with the provided parameters. That is, the command processor engine 14 calls the identified function 84 with the provided parameters and receives a response to the function call. The command processor engine 14 then sends the execution result 88 to the AI engine 12.

The AI engine 12 and command processor engine 14 repeatedly perform an iterative instruction execution loop 90 until obtaining a stop conduction, which results in the AI engine 12 sending a stop instruction 92 to the command processor engine 14. In the iterative instruction execution loop 90, the AI engine 12 determines the execution flow 80 of the one or more function calls 84 for obtaining the intended result based on the received prompt, the functions list, and the received execution result. The AI engine 12 determining the execution flow 80 may comprise the AI engine 12 using the execution flow 80 determined previously. For example, the execution flow 80 may comprise a flow chart indicating an ordered list of function calls. The execution flow 80 may be multiple paths that are selected depending on a result of the function calls. Based on the received execution result 88, the AI engine 12 may determine a current location (e.g., a next function call) in the previously determined execution flow 80.

The AI engine 12 then determines from the execution flow 80 a set of instructions 94 for sending to the command processor engine 14. The set of instructions 94 includes at least one of the stop instruction 92, or the identified function 84 and the provided parameters 86 for calling the identified function 84. When the stop condition has not been reached, the AI engine 12 determines a next function call (i.e., the identified function 84 and the provided parameters 86 for calling the identified function 84). The AI engine 12 sends the identified function 84 and the provided parameters 86 to the command processor engine 14. When the command processor engine 14 receives a set of instructions 94 including an identified function 84 and provided parameters 86 (i.e., not a stop instruction), the command processor engine 14 calls the identified function of the API 84 using the provided parameters 86 and receives a result of this function call (i.e., the execution result 88). The command processor engine 14 sends this execution result 88 to the AI engine 12.

Upon receiving the execution result 88, the iterative instruction execution loop 90 is again performed until obtaining the stop condition 92. The stop condition 92 may be at least one of obtaining the intended result or encountering an anomaly. That is, the stop condition 92 may be obtained when the intended result of the prompt has been completed (e.g., a secure new firewall rule has been created). The stop condition 92 may also be obtained when an anomaly is encountered (e.g., something occurs that blocks the completion of the intended result). An anomaly may encompass various irregularities, such as a function call returning an error, reaching a time-out (e.g., when an API function call does not respond within an allotted timeframe), exceeding resource constraints (e.g., surpassing a maximum number of compute cycles), hitting iteration limits, etc.

The stop instruction received by the command processor engine 14 from the AI engine 12 may indicate a status of the request. For example, the stop instruction may indicate whether the intended result was accomplished or whether an error occurred.

The execution result 88 sent to the AI engine 12 by the command processor engine 14 may include additional information. For example, the execution result 88 may additionally include the determined prompt 74 and the functions list 76. In this way, the AI engine 12 may determine the execution flow 80 for each execution result 88 using the prompt 84, function list 76, and result of the previous function call. This may allow the AI engine 12 to receive requests simultaneously without requiring the AI engine 12 to store previously determined execution flows 80 and to associate these determined execution flows 80 with a particular request.

With the complexity of software services and their diverse applications, there's a need to offer administrators a tailored and streamlined method to frequently used actions. In one embodiment, by introducing shortcuts and a library of shortcuts, the system aims to simplify repetitive tasks and offer a repository of actions for varied operational needs.

In one embodiment, the command processor engine 14 further includes a memory 98 comprising a non-transitory computer readable medium storing at least one shortcut 100 (also referred to as a library of shortcuts). The trigger 72 may be included in a selected shortcut. That is, each shortcut 100 may include a trigger 72 that is received by the command processor engine 14 when the shortcut is executed. Each of the shortcuts 100 may include a preselected prompt 102 and/or one or more required parameters 104. When the shortcut 100 is initiated by the user, the user may be prompted to provide the required parameters 104. The provided required parameters 104 may be combined with the preselected prompt 102 to generate the determined prompt 74.

For example, administrators may have the ability to define shortcuts for frequently used actions. These shortcuts may include zero or more parameters and a prompt template. When a shortcut is invoked, the user may be prompted to provide the necessary parameters, which are then populated in the template to generate a specific prompt for execution. The shortcut(s) may be created using a user interface or by importing a configuration file.

The library of shortcuts may be configurable and updateable. For example, a user may add to, update, delete, or modify the library of shortcuts. The library of shortcuts may also receive updates from a server.

The command processor engine 14 may store in the memory 98 a library of shortcuts 106. As described above, each shortcut 100 of the library of shortcuts 106 may contain a preselected prompt 102 (also referred to as a prompt template) and/or one or more required parameters 104. When a shortcut 100 (either from the library 106 or user defined) is invoked, the prompt 74 may be determined by populating the preselected prompt 102 with the parameters. When a shortcut is triggered automatically (i.e., not manually by a user), the required parameters (if the triggered shortcut includes required parameters) may be provided by the trigger 72. For example, when the trigger 72 is a security event such as an indication that an attack was detected from a source IP address, the source IP address may be used to resolve the required parameters of a selected shortcut of the library of shortcuts 106.

The computer circuitry 18 and processor circuitry 68 may have various implementations. For example, the computer circuitry 18 and processor circuitry 68 may include any suitable device, such as a processor (e.g., CPU, Graphics Processing Unit (GPU), Tensor Processing Unit (TPU), etc.), programmable circuit, integrated circuit, memory and I/O circuits, an application specific integrated circuit, microcontroller, complex programmable logic device, other programmable circuits, or the like. The computer circuitry 18 and processor circuitry 68 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the computer circuitry 18 and processor circuitry 68. The computer circuitry 18 and processor circuitry 68 may be communicatively coupled to the computer readable medium and a network interface through a system bus, mother board, or using any other suitable structure known in the art.

The computer readable medium (memory) 16, 98 may be, for example, one or more of a buffer, a flash memory, a hard drive, a removable media, a volatile memory, a non-volatile memory, a random-access memory (RAM), or other suitable device. In a typical arrangement, the memory 16, 98 may include a non-volatile memory for long term data storage and a volatile memory that functions as system memory for the computer circuitry 18 and processor circuitry 68. The memory 16, 98 may exchange data with the processor circuitry over a data bus. Accompanying control lines and an address bus between the memory 16, 98 and the processor circuitry also may be present. The memory 16, 98 is considered a non-transitory computer readable medium.

AI engine 12 and command processor engine 14 may communicate with one another via any networked device capable of communication within a network infrastructure. Examples of such network devices include but are not limited to printers, Internet of Things (IoT) devices, routers, switches, access points, servers, printers, automobiles, security systems, thermostats and any other devices equipped with network interfaces. The network device may be connected through wired or wireless connections. It should be noted that the method is designed to be compatible with various network protocols and standards, such as Ethernet, Wi-Fi, Bluetooth, Zigbee, or cellular networks, allowing for flexible deployment in diverse networking environments.

The AI engine 12 and command processor engine 14 may each be embodied as any suitable computer device. These computer devices may encompass a wide range of computing devices suitable for performing the disclosed functions and methods. This includes but is not limited to servers, desktop computers, network switches, routers, laptops, mobile devices, tablets, and any other computerized device capable of executing software instructions. The computer devices may include standard components such as a processor, memory, storage, input/output interfaces, and other necessary elements to execute the methods effectively. Furthermore, the computer device is not limited to a single device but may be embodied in a distributed computing environment. In such an environment, multiple interconnected devices may collaborate and work in unison to execute the computational steps of the methods and functions.

Turning to FIG. 4, a method 200 is shown for enabling natural language interaction with an application programming interface (API) for performing a service. The method 200 involves processor circuitry executing the described steps.

In step group 201, computer circuitry of the AI engine 12 performs a creation flow for generating a canonical API specification 32. In step 202 of the creation flow, API code is received. In step 204 of the creation flow, API documentation is received and/or processed as described above. In step 206 of the creation flow, a standardized API specification is generated from the API documentation and/or the API code. In step 208 of the creation flow, a canonical API specification is generated from the standardized API specification.

In step group 220, the AI engine 12 and the command processor engine 14 perform a usage flow. In step 222, the command processor engine 14 receives a trigger and determines a prompt from the received trigger. In step 226, the command processor engine 14 sends to the AI engine the determined prompt and a functions list of the functions of the API. In step 228, the AI engine receives the determined prompt and the functions list and determines an execution flow of one or more function calls for obtaining an intended result based on the received prompt and the functions list. In step 232, the AI engine determines from the execution flow the identified function and the provided parameters for calling the identified function. Also in step 232, the AI engine sends the identified function and the provided parameters to the command processor engine.

In step 236, the command processor engine receives from the AI engine an identified function and provided parameters for calling the identified function. Also in step 236, the command processor engine calls the identified function of the API using the provided parameters. In step 240, the command processor engine receives and sends to the AI engine an execution result of calling the identified function with the provided parameters.

In step 242, the command processor engine and the AI engine repeatedly perform an iterative instruction execution loop until obtaining a stop condition. Step 242 includes the AI engine determining the execution flow of the one or more function calls for obtaining the intended result based on the received prompt, the functions list, and the received execution result. Step 242 also includes the AI engine determining from the execution flow the identified function and the provided parameters for calling the identified function. Step 242 further includes the AI engine sending the identified function and the provided parameters to the command processor engine.

Step 242 additionally includes the command processor engine receiving from the AI engine a set of instructions including at least one of the stop instruction, or the identified function and the provided parameters for calling the identified function. When the set of instructions includes the identified function and provided parameters, the command processor engine calls the identified function of the API using the provided parameters. Step 242 also includes the command processor engine receiving and sending to the AI engine the execution result of calling the identified function with the provided parameters. Upon obtaining the stop condition, the AI engine sends the stop instruction to the command processor engine.

The method 200 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 200 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for enabling natural language interaction with an application programming interface (API) for performing a service using an artificial intelligence (AI) engine, the computer device comprising:

processor circuitry configured to:

perform a creation flow for generating a canonical API specification comprising:

receiving API code, wherein the API code comprises computer code for performing the service;

processing API documentation comprising receiving or generating the API documentation for the API code, wherein, when the API documentation is generated, the processing of the API documentation includes:

sending a request including the API code to the AI engine to generate the API documentation; and receiving the API documentation from the AI engine;

generating from the processed API documentation a standardized API specification comprising:

sending a request to the AI engine to generate the standardized API specification from the API documentation; and receiving the standardized API specification from the AI engine; and generating from the standardized API specification the canonical API specification comprising:

sending a request to the AI engine to generate the canonical API specification from the standardized API specification; and receiving the canonical API specification from the AI engine, wherein the canonical API includes a verbose description of the API including functions of the API, parameters received by the API, and values returned by the API; and perform a usage flow as a command processor engine comprising:

receiving a trigger;

determining a prompt from the received trigger;

sending to the AI engine the determined prompt and a functions list of the functions of the API;

receiving from the AI engine an identified function and provided parameters for calling the identified function in order to achieve an intended result based on the determined prompt;

calling the identified function of the API using the provided parameters;

receiving and sending to the AI engine an execution result of calling the identified function with the provided parameters;

repeatedly performing an iterative instruction execution loop for achieving the intended result until receiving a stop instruction from the AI engine, comprising:

receiving from the AI engine a set of instructions including at least one of the stop instruction, or the identified function and the provided parameters for calling the identified function;

when the set of instructions include the identified function and provided parameters:

calling the identified function of the API using the provided parameters; and receiving and sending to the AI engine the execution result of calling the identified function with the provided parameters.

2. The computer device of claim 1, wherein the canonical API specification includes:

an API call convention including at least one function outline, wherein each function outline includes a function name, a function path, a function method, and required parameters; and API AI information including at least one function explanation, wherein each function explanation includes the function name, a function description, function properties, and the required parameters.

3. The computer device of claim 1, wherein at least one of the standardized API specification comprises a standard OpenAPI API specification, or the canonical API has a YAML format.

4. The computer device of claim 1, wherein:

the canonical API specification includes examples usages of the API; and each example usage includes one or more of the received parameters and one or more of the returned values of the API.

5. The computer device of claim 4, wherein the examples of usages are generated by the AI engine from the API documentation.

6. The computer device of claim 1, wherein the trigger comprises at least one of:

user input including a description of a goal to achieve;

an event trigger initiated by a detected event; or a time trigger initiated periodically or at a specific time.

7. The computer device of claim 1, further comprising a memory comprising a non-transitory computer readable medium storing at least one shortcut, wherein:

the trigger is included in a selected shortcut of the at least one shortcut; and each of the at least one shortcut includes a preselected prompt.

8. The computer device of claim 7, wherein:

the shortcut further includes one or more required parameters;

when the shortcut is initiated by a user:

the user is prompted to provide the one or more required parameters; and the provided one or more required parameters are combined with the preselected prompt to generate the determined prompt.

9. The computer device of claim 7, wherein:

the memory additionally stores a library of shortcuts; and the trigger comprises a selection of the selected shortcut of the library of shortcuts.

10. The computer device of claim 1, wherein the execution result sent to the AI engine additionally includes the determined prompt and the functions list.

11. A system for enabling natural language interaction with an application programming interface (API) for performing a service, the method comprising:

an AI engine comprising a computer device including:

a memory comprising a non-transitory computer readable medium storing a natural language model (NLM);

computer circuitry configured to:

perform a creation flow for generating a canonical API specification comprising:

receiving API code, wherein the API code comprises computer code for performing the service;

processing API documentation comprising receiving or generating the API documentation for the API code, wherein, when the API documentation is generated, the processing of the API documentation includes:

sending a request including the API code to the AI engine to generate the API documentation; and receiving the API documentation from the AI engine;

generating from the processed API documentation and the API code a standardized API specification; and generating from the standardized API specification a canonical API specification, wherein the canonical API specification includes a verbose description of the API including functions of the API, parameters received by the API, and values returned by the API;

a command processor engine comprising an electronic device including:

processor circuitry configured to perform a usage flow comprising:

receiving a trigger;

determining a prompt from the received trigger;

sending to the AI engine the determined prompt and a functions list of the functions of the API;

receiving from the AI engine an identified function and provided parameters for calling the identified function;

calling the identified function of the API using the provided parameters;

receiving and sending to the AI engine an execution result of calling the identified function with the provided parameters;

repeatedly performing an iterative instruction execution loop until receiving a stop instruction from the AI engine, comprising:

receiving from the AI engine a set of instructions including at least one of the stop instruction, or the identified function and the provided parameters for calling the identified function;

when the set of instructions include the identified function and provided parameters:

calling the identified function of the API using the provided parameters; and receiving and sending to the AI engine the execution result of calling the identified function with the provided parameters;

wherein the computer circuitry of the AI engine is further configured to perform the usage flow by:

receiving from the command processor engine the determined prompt and the functions list;

determining an execution flow of one or more function calls for obtaining an intended result based on the received prompt and the functions list;

determining from the execution flow the identified function and the provided parameters for calling the identified function;

sending the identified function and the provided parameters to the command processor engine;

receiving from the command processor engine the execution result of calling the identified function with the provided parameters;

repeatedly performing the iterative instruction execution loop until obtaining a stop condition, comprising:

determining the execution flow of the one or more function calls for obtaining the intended result based on the received prompt, the functions list, and the received execution result;

determining from the execution flow the identified function and the provided parameters for calling the identified function;

sending the identified function and the provided parameters to the command processor engine;

receiving from the command processor engine the execution result of calling the identified function with the provided parameters; and upon obtaining the stop condition, sending the stop instruction to the command processor engine.

12. The system of claim 11, wherein the stop condition comprises at least one of obtaining the intended result or encountering an anomaly.

13. The system of claim 11, wherein the canonical API specification includes:

an API call convention including at least one function outline, wherein each function outline includes a function name, a function path, a function method, and required parameters; and API AI information including at least one function explanation, wherein each function explanation includes the function name, a function description, function properties, and the required parameters.

14. The system of claim 11, wherein at least one of the standardized API specification comprises a standard OpenAPI API specification, or the canonical API has a YAML format.

15. The system of claim 11, wherein:

the canonical API specification includes examples usages of the API generated by the AI engine from the API documentation; and each example usage includes one or more of the received parameters and one or more of the returned values of the API.

16. The system of claim 11, wherein the trigger comprises at least one of:

user input including a description of a goal to achieve;

an event trigger initiated by a detected event; or a time trigger initiated periodically or at a specific time.

17. The system of claim 11, wherein the command processor engine further includes a memory comprising a non-transitory computer readable medium storing at least one shortcut, wherein:

the trigger is included in a selected shortcut of the at least one shortcut; and each of the at least one shortcut includes a preselected prompt.

18. The system of claim 17, wherein:

the shortcut further includes one or more required parameters;

when the shortcut is initiated by a user:

the user is prompted to provide the one or more required parameters; and the provided one or more required parameters are combined with the preselected prompt to generate the determined prompt.

19. The system of claim 17, wherein:

the memory of the command processor engine further stores a library of shortcuts; and the trigger comprises a selection of the selected shortcut of the library of shortcuts.

20. The system of claim 11, wherein the execution result sent to the AI engine additionally includes the determined prompt and the functions list.

* * * * *